(12) United States Patent
Moore et al.

(10) Patent No.: US 9,663,268 B2
(45) Date of Patent: May 30, 2017

(54) CONTAINER ROLL OUT WAREHOUSING SYSTEM

(71) Applicant: Sea Box International, Canberra (AU)

(72) Inventors: Shaun Moore, Canberra (AU); Bruce Power, Canberra (AU); Thomas Egan, Canberra (AU); Andrew Constantine, Western Australia (AU); Robert Lowe, Western Australia (AU)

(73) Assignee: Sea Box International, Canberra, Australian Capital Territy (AU)

( * ) Notice: Subject to any disclaimer, the term of this patent is extended or adjusted under 35 U.S.C. 154(b) by 0 days.

(21) Appl. No.: 14/774,530

(22) PCT Filed: Jul. 30, 2014

(86) PCT No.: PCT/AU2014/050157
§ 371 (c)(1),
(2) Date: Sep. 10, 2015

(87) PCT Pub. No.: WO2015/066761
PCT Pub. Date: May 14, 2015

(65) Prior Publication Data
US 2016/0101893 A1 Apr. 14, 2016

(30) Foreign Application Priority Data

Nov. 7, 2013 (AU) .................................. 2013904295
Jun. 11, 2014 (AU) .................................. 2014203159

(51) Int. Cl.
*B65D 19/38* (2006.01)
*B65D 19/06* (2006.01)
(Continued)

(52) U.S. Cl.
CPC ....... *B65D 19/385* (2013.01); *B65D 19/0069* (2013.01); *B65D 19/06* (2013.01);
(Continued)

(58) Field of Classification Search
CPC .. B65D 19/385; B65D 19/0069; B65D 19/06; B65D 19/42; B65D 2519/00024
(Continued)

(56) References Cited

U.S. PATENT DOCUMENTS 2,936,985 A * 5/1960 Doerr .................... B65D 19/08
108/54.1
3,207,095 A * 9/1965 Hiatt, Jr. ............ A47B 87/0223
108/53.5
(Continued)

FOREIGN PATENT DOCUMENTS

GB         2329378 A      3/1999

OTHER PUBLICATIONS

ISA/IN, International Search Report and Written Opinion for Int'l Appln No. PCT/IN2014/000157, Sep. 26, 2014, 11 pages.

*Primary Examiner* — Jose V Chen
(74) *Attorney, Agent, or Firm* — Fish & Tsang, LLP

(57) ABSTRACT

A container rollout warehousing system is contemplated that includes at least two inter-connectable modular platforms with each platform having at least one roller at one end. The two or more platforms are inter-connectable such that the central longitudinal axis of the platforms are collinear and the two or more platforms are also vertically stackable in a spaced apart relationship to receive cargo therebetween.

19 Claims, 21 Drawing Sheets

(51) Int. Cl.
   *B65D 19/00* (2006.01)
   *B65D 19/42* (2006.01)
   *B65G 1/00* (2006.01)

(52) U.S. Cl.
   CPC ............... *B65D 19/42* (2013.01); *B65G 1/00* (2013.01); *B65D 2519/00024* (2013.01); *B65D 2519/00029* (2013.01); *B65D 2519/00059* (2013.01); *B65D 2519/0094* (2013.01); *B65D 2519/0097* (2013.01); *B65D 2519/0099* (2013.01); *B65D 2519/00233* (2013.01); *B65D 2519/00273* (2013.01); *B65D 2519/00288* (2013.01); *B65D 2519/00323* (2013.01); *B65D 2519/00333* (2013.01); *B65D 2519/00577* (2013.01); *B65D 2519/00582* (2013.01); *B65D 2519/00676* (2013.01); *B65D 2519/00761* (2013.01); *B65D 2519/00781* (2013.01); *B65D 2519/00796* (2013.01)

(58) Field of Classification Search
   USPC ...................... 108/53.3, 54.1, 51.11
   See application file for complete search history.

(56) References Cited

U.S. PATENT DOCUMENTS

| | | | | |
|---|---|---|---|---|
| 3,327,654 A * | 6/1967 | Duncan | ................. | B65D 19/12 |
| | | | | 108/53.1 |
| 3,565,018 A * | 2/1971 | Jay | .................... | B65D 19/385 |
| | | | | 108/53.1 |
| 3,620,388 A * | 11/1971 | St. Ives | ............... | B65D 88/129 |
| | | | | 108/53.1 |
| 3,783,800 A * | 1/1974 | Bucker | ................ | F26B 25/063 |
| | | | | 108/53.5 |
| 3,830,381 A * | 8/1974 | Bodenheimer | ...... | B65D 88/121 |
| | | | | 108/53.1 |
| 4,673,092 A * | 6/1987 | Lamson | ............... | A47B 47/028 |
| | | | | 108/53.1 |
| 4,834,000 A * | 5/1989 | Darnell | ................. | B65D 19/42 |
| | | | | 108/55.1 |
| 5,692,625 A * | 12/1997 | Filipescu | ............... | A47B 43/00 |
| | | | | 211/194 |
| 5,799,585 A * | 9/1998 | Brennan, Jr. | ...... | B65D 19/0026 |
| | | | | 108/53.1 |
| 5,918,551 A * | 7/1999 | Liu | ........................ | B65D 19/10 |
| | | | | 108/53.1 |
| 6,726,041 B2 * | 4/2004 | Dunn | ..................... | B65D 19/12 |
| | | | | 206/335 |
| 7,491,024 B2 * | 2/2009 | Heinrichs | .............. | B65D 19/12 |
| | | | | 108/53.1 |
| 7,739,965 B2 | 6/2010 | Heinrichs et al. | | |
| 7,802,527 B2 * | 9/2010 | Dong | .................... | B65D 19/001 |
| | | | | 108/54.1 |
| 8,438,980 B2 * | 5/2013 | Pichereau | ................. | B62B 3/04 |
| | | | | 108/55.5 |
| 8,857,634 B2 * | 10/2014 | Harris | ................... | B65D 19/08 |
| | | | | 108/53.1 |
| 8,925,470 B2 * | 1/2015 | Hart | ........................ | F16M 3/00 |
| | | | | 108/55.1 |
| 2002/0005389 A1 | 1/2002 | Guo | | |
| 2005/0252423 A1 * | 11/2005 | Baker | ................... | B65D 90/18 |
| | | | | 108/55.1 |
| 2006/0118504 A1 * | 6/2006 | Willemsen | ............. | B08B 9/093 |
| | | | | 211/189 |
| 2008/0250986 A1 * | 10/2008 | Boon | ...................... | B65D 88/005 |
| | | | | 108/53.1 |
| 2015/0266612 A1 * | 9/2015 | Ma | ....................... | B65D 88/005 |
| | | | | 108/54.1 |

* cited by examiner

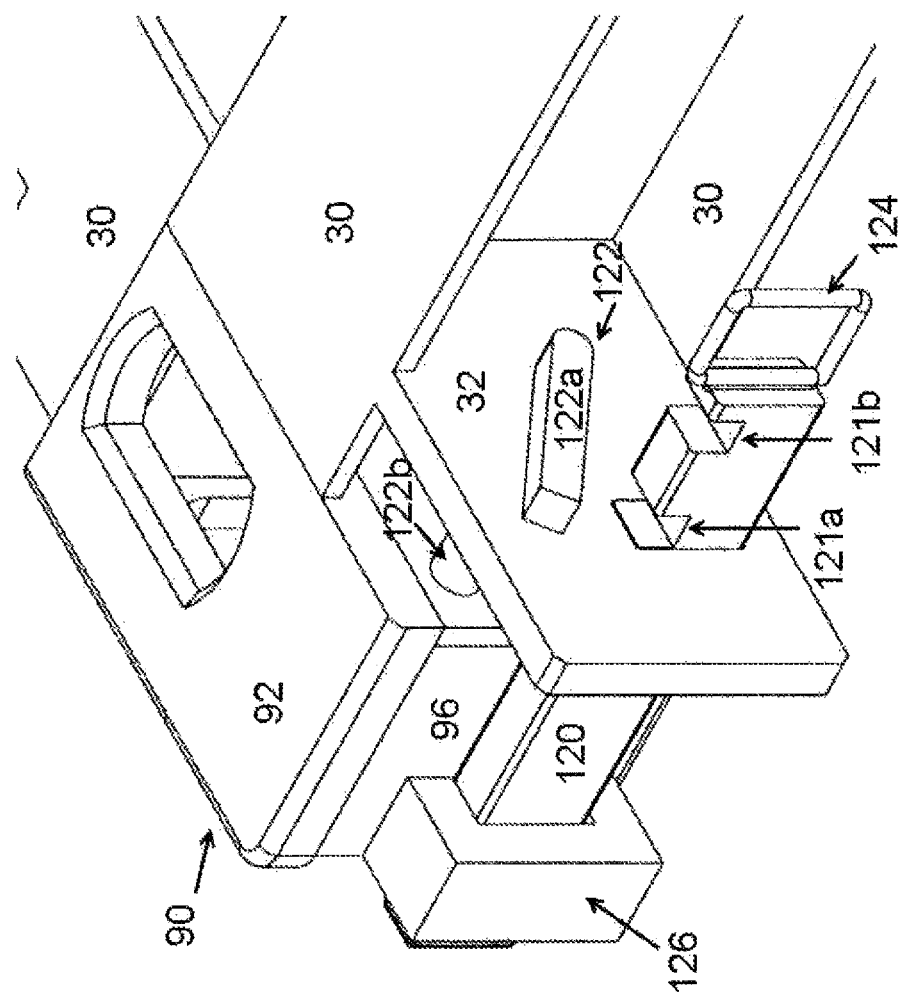

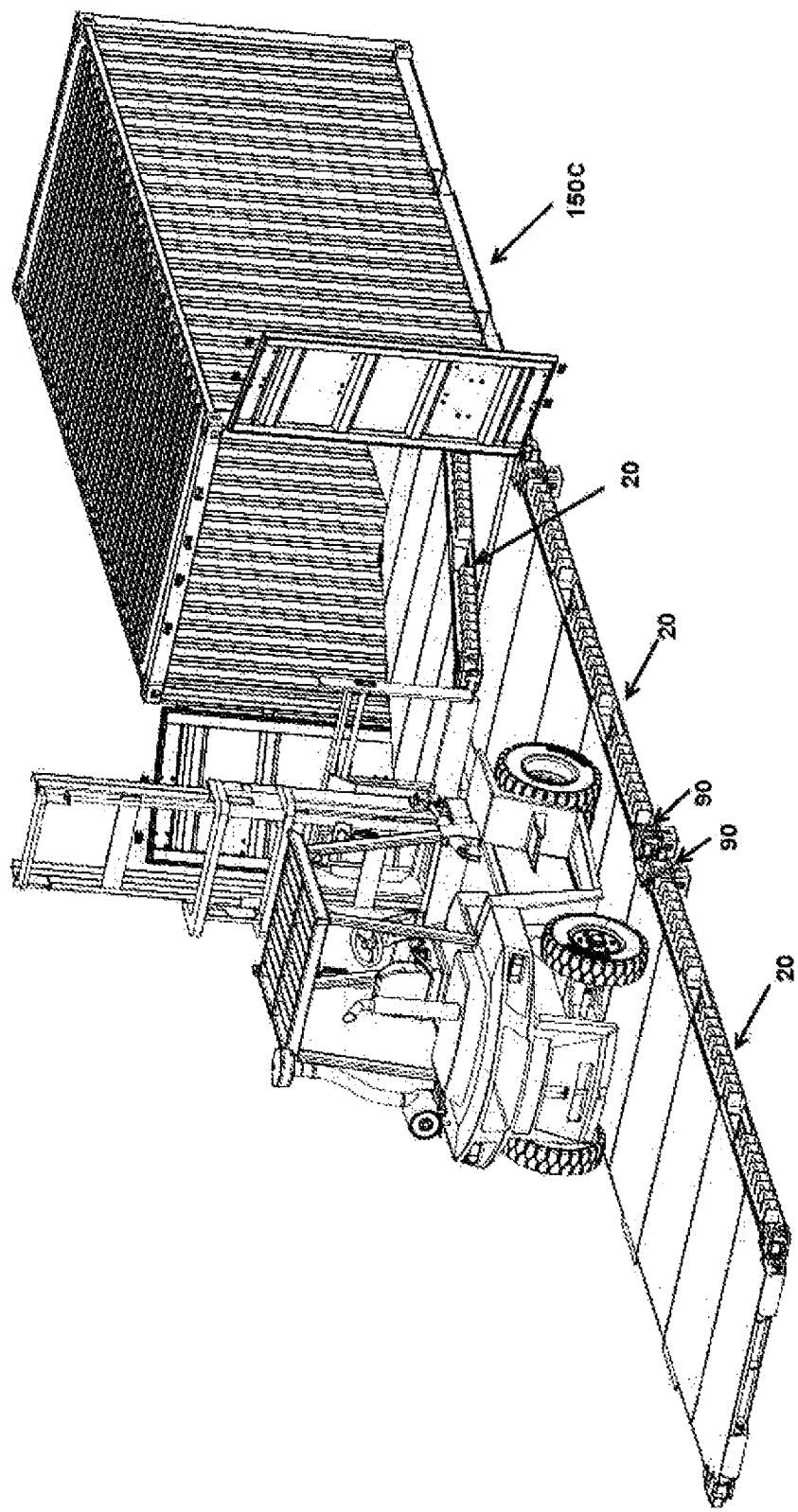

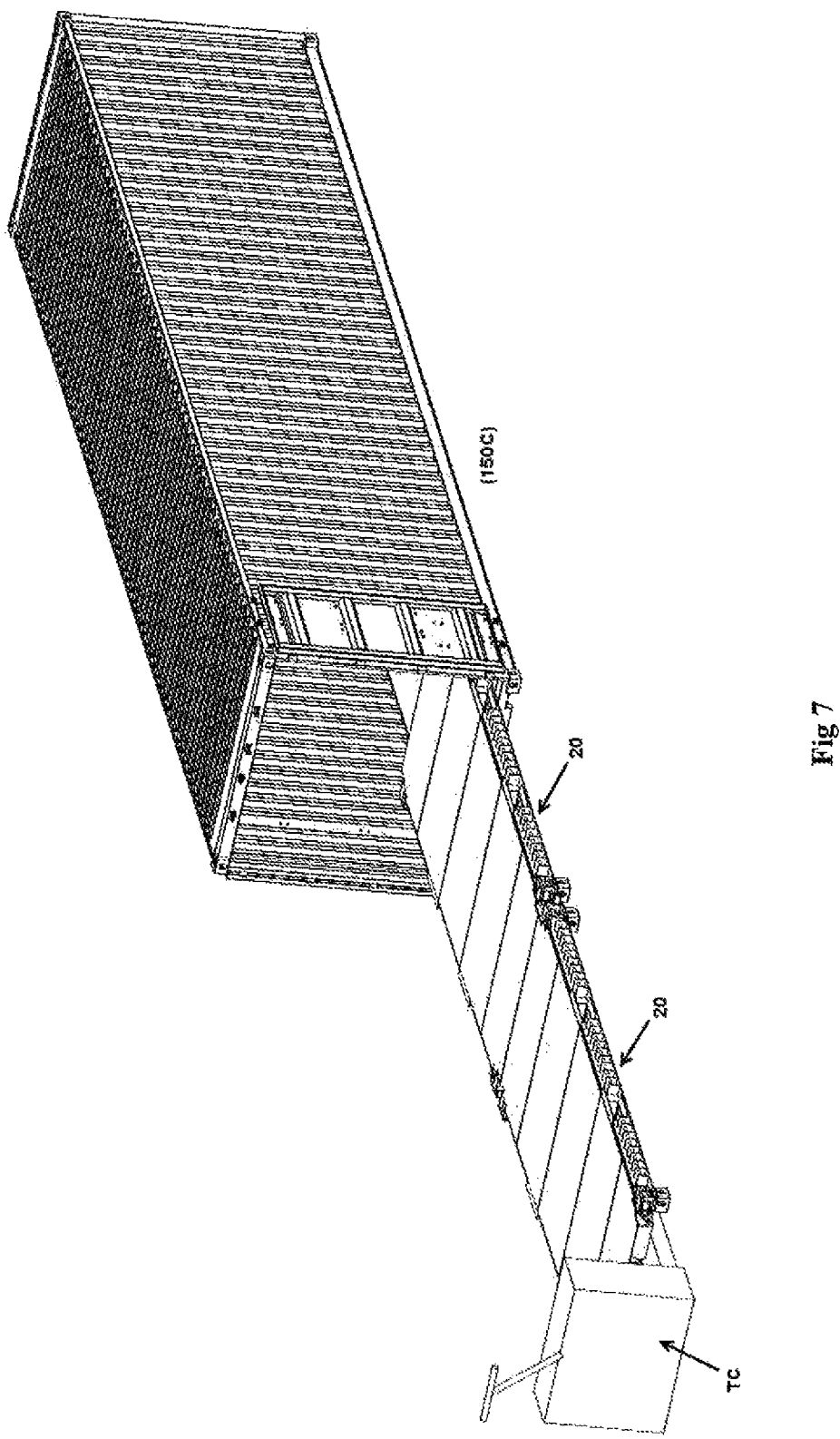

CONTAINER ROLL OUT WAREHOUSING SYSTEM

This application claims priority to Australian Provisional Application AU 2013904295, entitled "Container Roll Out Warehousing System" filed on 7 Nov. 2013, which is incorporated herein by reference in its entirety.

This application also claims priority to Australian Standard Application AU 2014203159 entitled "Container Roll Out Warehousing System" filed on 11 Jun. 2014, which is incorporated herein by reference in its entirety.

DESCRIPTION OF INVENTION

A container roll out warehousing system (CROWS) which includes at least two inter-connectable and stackable modular platforms for carrying and storing cargo.

TECHNICAL FIELD

The CROWS relates to the storage and transportation of large bulk, heavy, or awkward items in to and out of ISO shipping containers.

The CROWS also provides the capability for an internal shelf arrangement within the cargo space of an ISO shipping container.

The CROWS also provides for warehousing capability as the inter-connectable modular platforms may move from a nested position to a series of interconnected platforms for the storage of bulk items when operating in a storage yard environment.

The CROWS system relates to the rapid loading, unloading and storage of cargo from ISO shipping containers in a heavy industrial or military environment, The CROWS also relates to storage and transportation of large bulk items in and out of a quarantine compliant ISO shipping container.

BACKGROUND

The use of ISO shipping containers to transport large bulk items is well known. For example in the mining industry or military environment, large mechanical structures or industrial items are often transported using ISO shipping containers. However one disadvantage of such large items is that they cannot be readily manoeuvred in to or out of the ISO shipping container, thereby creating inefficiencies and time delays in the loading and unloading of such goods. Such time delays may be hazardous to the user in a hostile military environment.

The sheer size and weight of such items also prevents the use of known transportation aides such as timber pallets and the like.

In addition, many environments require the strict application of quarantine regulations. Accordingly, cargo requiring transportation to and storage in, such environments is also subject to quarantine regulations. This often results in the cargo items having to be individually wrapped to provide a water tight and air tight environment around the cargo to isolate the cargo from the outside environment.

For large bulk cargo such as mining equipment or military hardware, it is often not possible to individually wrap the item to make the cargo air or water tight. Alternatively, even if this is achievable, it is very cost prohibitive and time consuming due to the bulk and irregular shape of the cargo.

The container roll out warehousing system provides one or more inter-connectable modular platforms for carrying and storing cargo; the platforms may be rolled directly in to or out of an ISO shipping container as and when required.

Further, the container roll out warehousing system provides one or more inter-connectable modular platforms carrying cargo which may be rolled directly in to a quarantine compliant ISO shipping container thereby eliminating the need to individually wrap the bulk cargo item.

The container roll out warehousing system also provides for a raised platform to keep the cargo item off the floor of the ISO shipping container, or off the ground in a storage yard.

SUMMARY OF THE INVENTION

In a particularly preferred embodiment of the invention, a container roll out warehousing system for carrying or storing cargo, comprises at least two inter-connectable modular platforms, wherein each platform includes: a substantially planar top surface for receiving cargo; at least one roller unit at a first lateral end of the platform; a pair of open fork lift pockets transverse to a central longitudinal axis of the platform; two pair of fork lift pocket plates at a second lateral end of the platform opposite to the first lateral end, to locate the lifting tines of a lifting device under the platform; and a corner casting at each corner of the first and second lateral ends of the platform; and wherein the container roll out warehousing system is operable so that two or more of said platforms are releasably inter-connectable such that the central longitudinal axes of the two or more platforms are collinear; and also releasably inter-connectable such that the two or more platforms are vertically stackable in a spaced apart relationship using a plurality of removable corner posts releasably fastenable to the corner castings of the two or more platforms to vertically space apart the said two or more platforms.

In a further preferred form of the invention, the footprint of the at least one platform substantially conforms to the internal footprint of an ISO shipping container to minimise the space between the shipping container walls and the platform once the platform is positioned within the ISO shipping container.

In a further preferred form of the invention the plurality of removable corner posts are each releasably anchorable to a corner of each of two platforms to provide two interconnected vertically spaced apart platforms rollable into an ISO shipping container.

In a further preferred embodiment of the invention each platform includes a locking bar mounted at each corner of the second lateral end of each of the at least one platform.

In an alternative embodiment of the present invention a guide roller is mounted to each corner casting at the first lateral end of the at least one platform.

In a further alternative embodiment of the present invention each of the pair of open fork lift pockets transverse to the longitudinal axis of the platform includes a substantially U-shaped channel transverse to the longitudinal axis of the platform.

In one preferred embodiment of the present invention, up to eight platforms are nestable on top on each other such that the combined height of eight platforms fits within an ISO shipping container for storage or further transportation.

Other preferred features of the various aspects of the invention will be apparent from the dependant claims and from the following description of the preferred embodiments.

BRIEF DESCRIPTION OF THE DRAWINGS

FIG. 1C—a perspective view of the locking bars of the platform according to FIG. 1 in unlocked position;

FIG. 6—illustrates the single platform single platform of Fig being loaded into an ISO shipping container;

FIG. 7—illustrates two collinear platforms according to FIG. 1 being loaded into an ISO shipping container;

DETAILED DESCRIPTION

Figure 1:
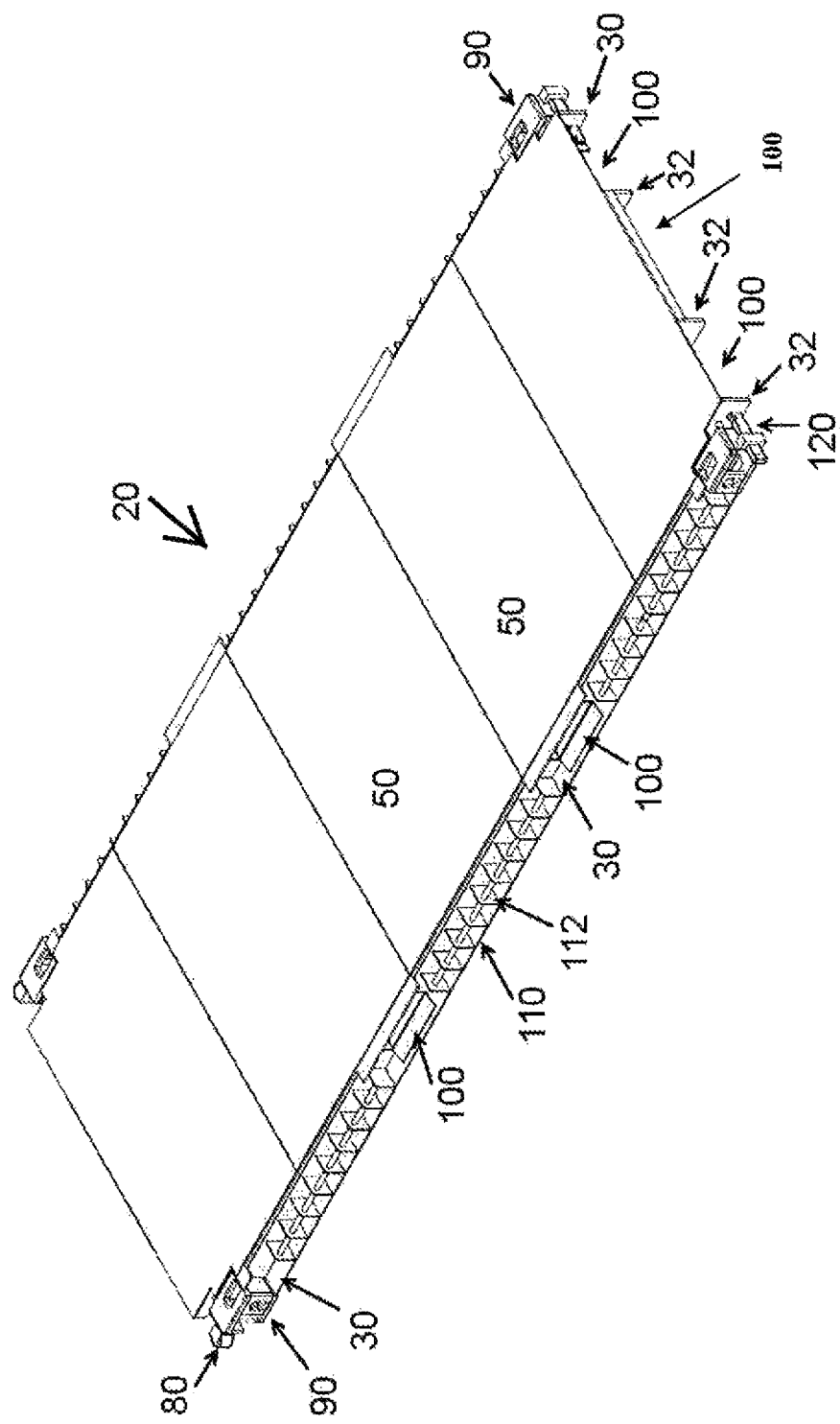
FIG. 1—illustrates a top perspective of a single platform according to an embodiment of the container roll out warehousing system of the present invention.
Figure 2:
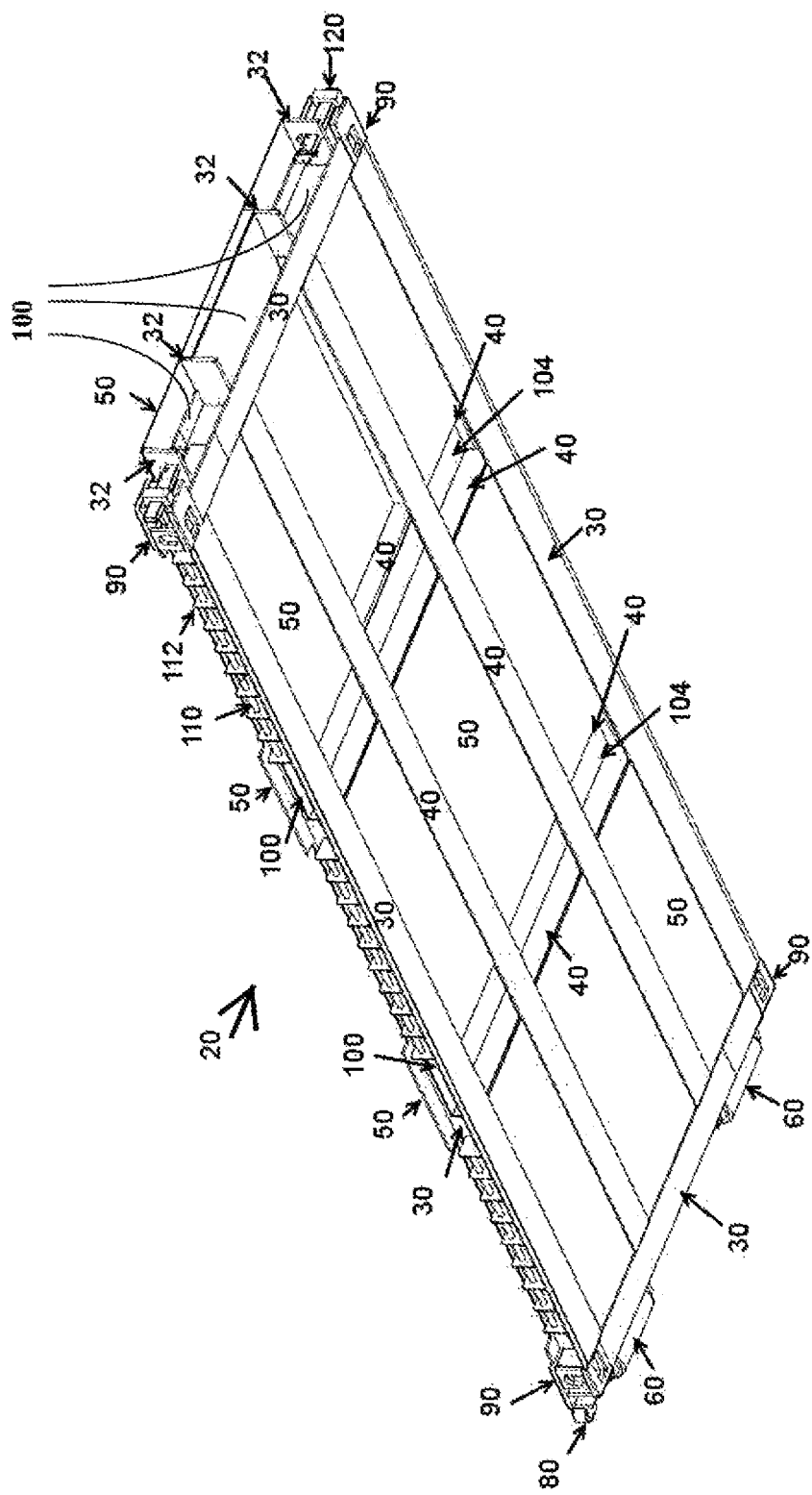
FIG. 2—illustrates a perspective, bottom view of the single platform according to FIG. 1.

FIGS. 1 and 2 respectively illustrate a top perspective view and a bottom perspective view of a single platform 20 of the container roll out warehousing system according to one embodiment of the present invention. The platform 20 includes multiple panels of tread plate decking 50 mounted onto a frame 30 and sub-frame 40. In a preferred embodiment, frame 30 provides a substantially rectangular external skeleton for the platform 20, with sub-frame 40 providing additional support in the form of bracing within the footprint of the frame 30. Sub-frame 40 extends both parallel and transverse to the longitudinal axis of the frame 30. The platform 20 further includes two roller units 60 at a first lateral end of the platform 20 which allows the platform once tipped up, typically by a fork-lift, to roll into and out of an ISO shipping container.

Preferably, frame 30 composed of two longitudinal "C" beam maul beams and steel fabricated cross members to form the rectangular skeleton upon which sub-frame 40 and tread plate decking 50 is mounted. Further, each of the frame 30, sub-frame 40 and tread plate decking is preferable constructed of Corten equivalent steel and all steel work is preferably assembled using manual, automatic or semi-automatic metal inert gas (MIG) and CO2 "Arc" (MAG) welding.

Once constructed, all steel components are preferably primed against corrosion and additionally primed with suitable known Epoxy primers. However, it will be understood by those in the art that other materials may be suitable for an individual component. For example the tread plate decking may be made of timber and screwed to the frame 30 where a reduction in overall weight is preferred.

Preferably, the platform 20 includes a pair of guide rollers 80 mounted to the frame 30 of the platform 20 at each corner of the lateral side of the platform 20 carrying the roller units 60. Further mounted to each corner of the frame 30 are corner castings 90. The corner castings 90 allow the platform 20 to be fixed to further components such as removable corner posts 140 as shown in the embodiment of FIG. 3A for example. The corner castings 90 are preferably releasably fastened to any further components using ISO twist-lock fasteners well known in the art.

In a preferred form, a pair of open fork lift pockets 100 laterally traverse the platform 20, whilst a second pair of open fork-lift pockets 100 extend longitudinally along the platform 20. This allows fork-lift access to lift/lower the platform 20 irrespective of whether the platform 20 is positioned lateral to, or longitudinal to the tines of the fork lift. The longitudinal open fork pockets 100 are created by two pair of fork pocket plates 32 which extend parallel to the longitudinal axis of the frame 30 at the end of the platform 20 opposite to roller units 60. The fork lift pocket plates 32 guide and locate the tines of a forklift device into a cavity within the platform 20 created by the height of the frame 30. In this manner, the fork lift device may lift a second lateral end of the platform 20 and roll the platform along the ground, and in particular roll the platform 20 to the back of an ISO shipping container via the roller units 60 located at the first lateral end of the platform.

In a particularly preferred embodiment, for a platform sized to fit a 20 ft ISO shipping container, the tines of the fork lift device are inserted in between the two most centrally located fork lift pocket plates 32. The tines are then forced apart so that each fork lift tine abuts against the inside surface of each fork lift pocket plate 32 in order to create frictional engagement between each fork lift tine and each fork lift pocket plate. In an alternative embodiment, preferably for platforms dimensioned to fit into 40 ft ISO shipping containers, the fork lift tines of a fork lifting device are spaced apart and inserted in between the lateral most fork lift pocket plates 32 so as to optimise the distance the fork lift tines may be separated in the cavity on the underneath side of the platform 20.

As shown in FIG. 2, the open fork-lift pockets 100 transverse to the longitudinal axis of platform 20 are in the form of open channels 104 created by sub-frames 40 running transverse to the longitudinal portions of the frame 30; and by the underside of the tread plate decking 50. Preferably, the channels 104 are of a substantially U-shaped configuration. In a particularly preferred form of the invention, platform 20 includes multiple panels of tread plate decking 50 on the underside of the platform 20 extending from the first lateral roller unit end of the platform to the open channel 104 nearest to it, and further tread plate decking between the two open channels 104.

Fork lift pocket plates 32 act as locating guides for fork lift tines to engage with the underside of the tread plate decking 50 fixed to the top side of the platform 20. Fork lift tines are thereby able to lift the platform 20 so that the second lateral or locking bar end of the platform 20 is raised and the platform 20 is rollable using the roller units 60 at the first lateral end of the platform.

In addition, preferably the tread plate decking 50 located on the top side of the platform 20 extends outwardly to cover the open fork lift pockets without extending beyond the frame 30 or beyond fork lift pocket plates 32.

The open channels 104; exposed underside of the tread plate decking 50 at the locking bar 120 end of the platform 20; and substantially planar bottom surface of the platform 20 from the roller end up to and in-between the open channels 104; advantageously and significantly decrease flora and fauna quarantine contamination risks as well as decreases the inspection time required by Quarantine officers to inspect a platform carrying cargo prior to deployment into environmentally sensitive areas.

This is traditionally a time consuming task since known platforms typically have multiple angular sections of framework on the underside as well as internal cavities for receiving fork lift tines. Known platforms therefore have surfaces which are not readily visible or easy to inspect for unwanted flora and fauna which in turn more readily lends themselves to unwanted matter attaching itself to such platforms. Current alternatives to the use of CROWS, to attain appropriate environmental containment for specific cargo, require cargo loads to be covered and wrapped using a heavy plastic material. Advantageously, CROWS anecdotally provides a 60% saving in terms of time and cost, when compared to currently used measures, as well as reducing 'land fill' in the disposal of the plastic covers which are no longer required for cargo carried on a platform of the present invention.

The embodiment of FIGS. 1 and 2 also shows a tie down rail 110 running parallel to the longitudinal axis of the frame 30 for tying or otherwise securing cargo to the platform 20. The tie down rail 110 is partitioned by a series of tie down retainers 112 which prevent a rope or strap from sliding along the tied down rail 110.

Also shown in the embodiment of FIGS. 1 and 2 are a pair of locking bars 120 at the second lateral end of the platform 20 opposite the roller units 60. The locking bars 120 each lock the platform 20 against the interior door frame of an ISO shipping container in order to prevent the platform from inadvertently rolling within the ISO container. Each of the locking bars 120 is partially retained in a fork lift pocket plate 32 closest to a corner casting 90. This is described in more detail later with reference to FIGS. 1A, C, D and E.

In a preferred embodiment of FIG. 1 and FIG. 2, the footprint of the platform 20 substantially conforms to the internal footprint of an ISO shipping container so as to minimise the space between the shipping container walls and the platform once the platform 20 is positioned within the ISO shipping container.

In a particularly preferred embodiment, in order to minimise the space between the ISO shipping container walls and the platform 20; for a 20 ft shipping container, the platform 20 has a minimum length of approximately 5634 mm, a minimum width of approximately 2296 mm. However, as would be understood by the skilled person, the length of the platform 20 may be up to but not exceed 5897 mm, and width up to but not exceed 2337 mm for the platform to fit within an ISO 20 ft shipping container.

Figure 1A:
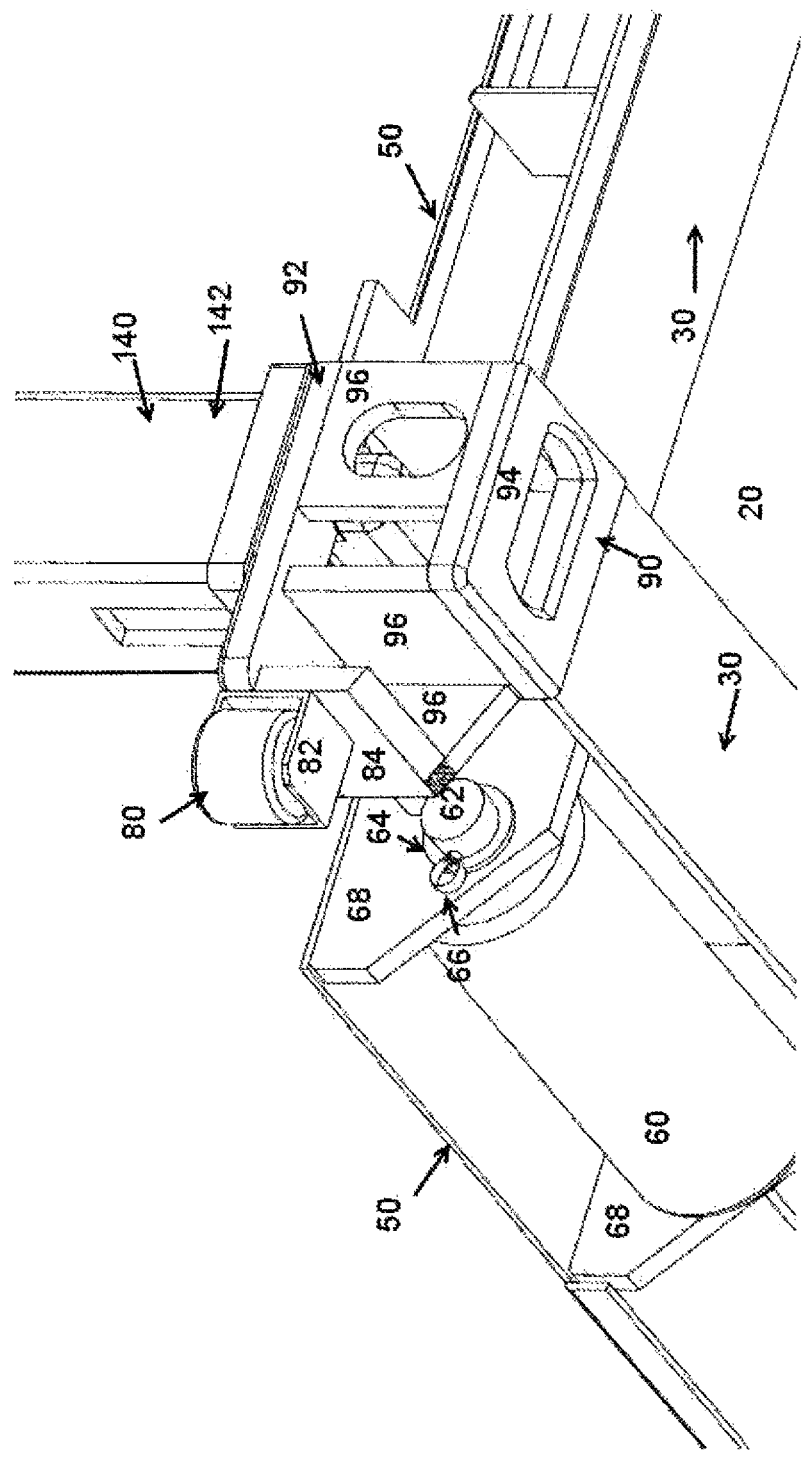
FIG. 1A—illustrates a bottom perspective view of a corner of the platform according to FIG. 1.

FIG. 1A provides a perspective view of a corner of the platform of FIG. 1 in more detail. As may be seen, two portions of the frame 30 abut, but are not presented flush with one another. This leaves a space to receive a corner casting 90. The corner casting 90 comprises an apertured base plate 94, a pair of side plates 96 perpendicular to the base plate 94, along with a top plate 92. Preferably, at least one of the side plates 96 is apertured to receive an ISO twist-lock for fastening the platform 20 to another body, or a hook for fitting a harness to lift the platform by a crane or the like. In the embodiment shown, apertured side plate 96 is slightly shorter in length than the length of the base plate 94. This creates an inspection hole for viewing the interior corner casting 90 so that users are able to visually inspect the orientation of any twist-lock inserted in apertured base plate 94.

In the embodiment shown in FIG. 1A the corner casting 90 is created by welding together each of the base, side and top plates. However, as would be recognised by those skilled in the art, each corner casting 90 may be cast as a single piece.

Extending from frame 30 is a pair of roller unit mounting brackets 68. The roller unit mounting brackets 68 are spaced sufficiently apart to receive a roller unit 60 on a roller unit axle 62 such that the axle may be fixed to each mounting bracket 68 using a known fastening mechanism such as a washer 64 locking pin 66 as shown in FIG. 1A. Tread plate decking 50 preferably extends over the roller unit mounting brackets 68 so that a planar surface is presented to receive cargo over the entire top surface of the platform 20, and the roller unit 60 is covered by the tread plate decking 50.

Guide roller 80 is retained in a guide roller bracket 82 which in turn is fixed to a portion of a corner casting side plate 96 via a guide roller mounting plate 84. Preferably, the guide roller mounting plate 84 is welded to the corner casting side plate 96. The guide roller bracket 82 is preferably welded to the guide roller mounting plate 84, but may also be fixed via other known mechanical fasteners. The guide roller bracket 82 retains the guide roller 80 in any known manner such that the guide roller 80 may roll freely and is exposed beyond the profile of the corner casting 90. In the preferred form shown in FIG. 1A, the corner casting top plate 92 is larger than the corner casting bottom plate 94 and sized to cover both the guide roller mounting plate 84 and corner casting side plate 96, to which the guide roller mounting plate is fixed.

As would be appreciated by the skilled person, both the roller units 60 and the guide rollers 80 may comprise well known commercially available cylindrical roller wheels. Preferably, the roller units and guide rollers have the properties of the McNylon™ type of rollers.

FIG. 1A also shows in part a removable corner post 140 having a corner post base plate 142 resting on the top plate 92 of the corner casting 90. The corner post of a particularly preferred embodiment is described in more detail with respect to FIGS. 3A-3B.

Figure 1B:
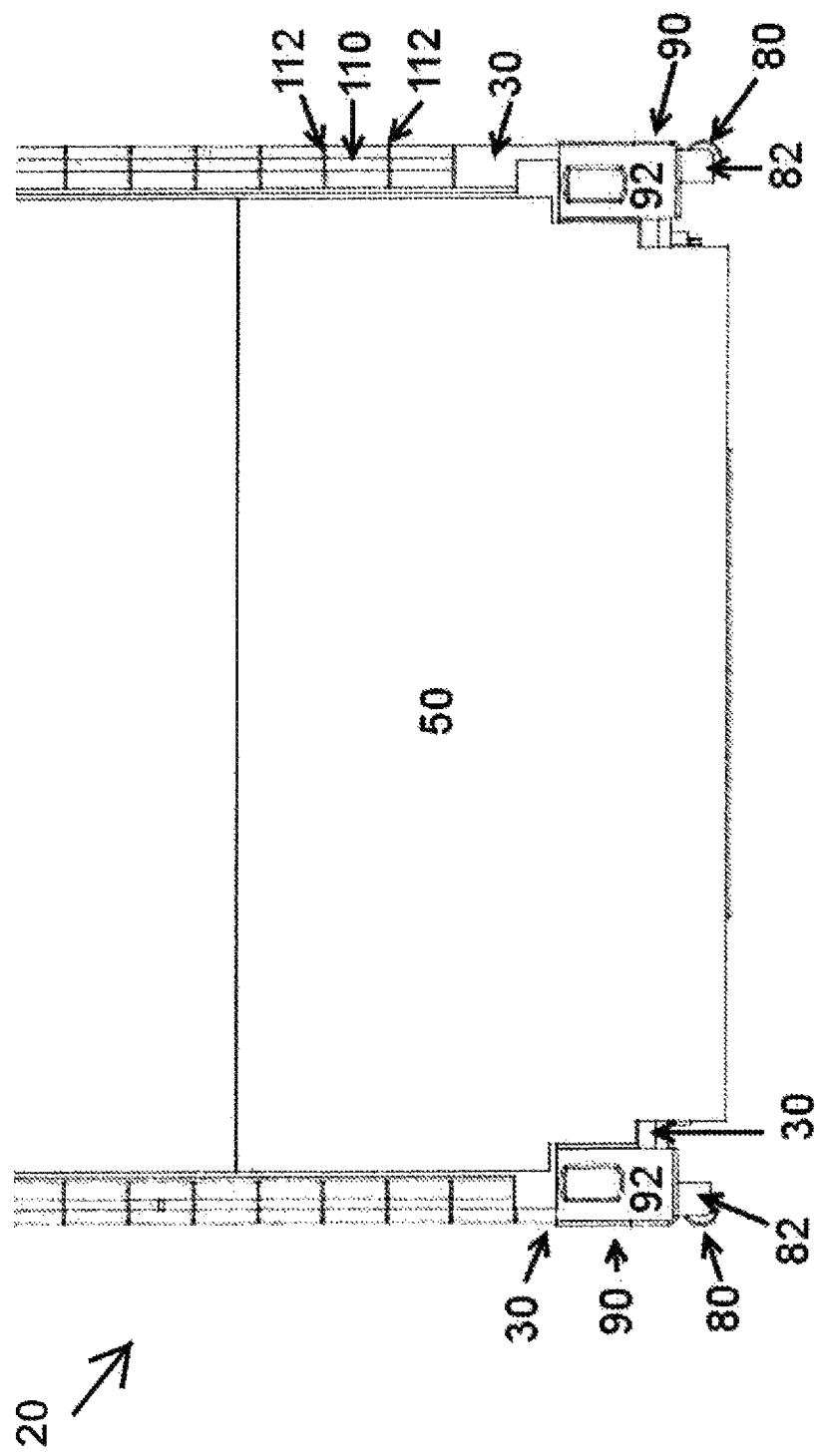
FIG. 1B—illustrates a top view of a portion of a single platform including the guide rollers of the embodiment of FIG. 1A.

FIG. 1B illustrates a partial top view of the platform according to FIGS. 1 and 2. In particular, FIG. 1B shows a pair of guide rollers 80 mounted to guide roller plates 82 which are in turn fixed to frame 30 via the guide roller mounting plates (not shown). The guide rollers 80 are mounted such that they sit proud of the footprint of the platform 20 so that the guide rollers engage with an interior side or interior end wall of an ISO container without the remainder of platform 20 contacting the interior of the ISO container during the roll in/roll out manoeuvre. The platform 20 is thereby realigned in the event where the platform is slightly misaligned with the ISO container. In a preferred form, the guide rollers 80 sit proud of the platform by approximately 3 mm. However it is understood that larger or smaller spacings may also be suitable.

The tread plate decking 50 at the first lateral roller unit end of the platform 20 shown in FIG. 1B is preferably shaped to extend over and cover the roller units. This protects the roller units from accidental damage as well as dirt and debris jamming the roller unit. Preferably, the tread plate decking 50 does not extend over the corner castings 90, tide down rails 110 or tide down retainers 112 of the platform 20.

FIG. 1B also shows an apertured top plate 92 of corner castings 90. The apertured top plate 92 of each corner casting 90 is dimensioned to receive a post anchor of the removable corner post of the preferred embodiment; or receive a container lifting hook for attachment to heavy lifting equipment to allow the platform 20 to be lifted without using fork lift pockets.

FIG. 1C illustrates a perspective view of a locking bar 120 of the platform 20 according to FIG. 1 in unlocked position. As may be seen, an aperture in the fork pocket plate 32 closest to a corner casting 90, slidably receives a locking bar 120 which also extends through a locking bar retainer 126. The locking bar also includes locking bar recesses 121a and 121b which in turn receive locking bar latch 122. Locking bar recess 121a receives the head 122a of locking bar latch 122 when the locking bar is withdrawn to an unlocked position, whilst locking bar recess 121b receives the head 122a of locking bar latch 122 when the locking bar is extended to the locked position.

The head of the locking bar latch 122a is received by the respective locking bar recesses 121a and 121b in order to prevent any inadvertent movement of the locking bar 120 from the unlocked position to a locked position whilst outside of an ISO shipping container, which would present a trip hazard. Alternatively, movement from a locked position to an unlocked position during transportation of the platform in an ISO shipping container is prevented, which in turn may prevent the platform from moving about within the container during transport. In a preferred form, locking bar latch 122 includes head 122a and perpendicular to the head 122a an axle 122b. The axle 122b extends through fork lift pocket plate 32 and through a side plate 96 of the corner casting 90. The axle 122b is rotatable retained within the corner casting 90 through any suitable means known in the art. For example, the axle 122b may include a screw thread at its end and screw into a threaded hole in the side plate 96.

Preferably, the locking bar 120 is moved between the locked and unlocked positions by the user gripping and moving locking bar handle 124 forward and back to align the desired locking bar recess 121a or 121b with the head 122a of the locking bar latch 122. In a preferred form the locking bar handle 124 is rotatably fixed to the locking bar so that it may be rotated to a position parallel to fork lift pocket plate 32 when not in use.

Locking bar retainer 126 is preferably a U-shaped steel piece welded to a side plate 96 of the corner casting 90. However, as would be understood by those in the art, the locking bar retainer 126 may be fixed to the side plate 96 by any suitable alternate means, and of any suitable shape to retain the locking bar 120 substantially horizontal and parallel to the side plate 96 of the corner casting 90.

Figure 1D:
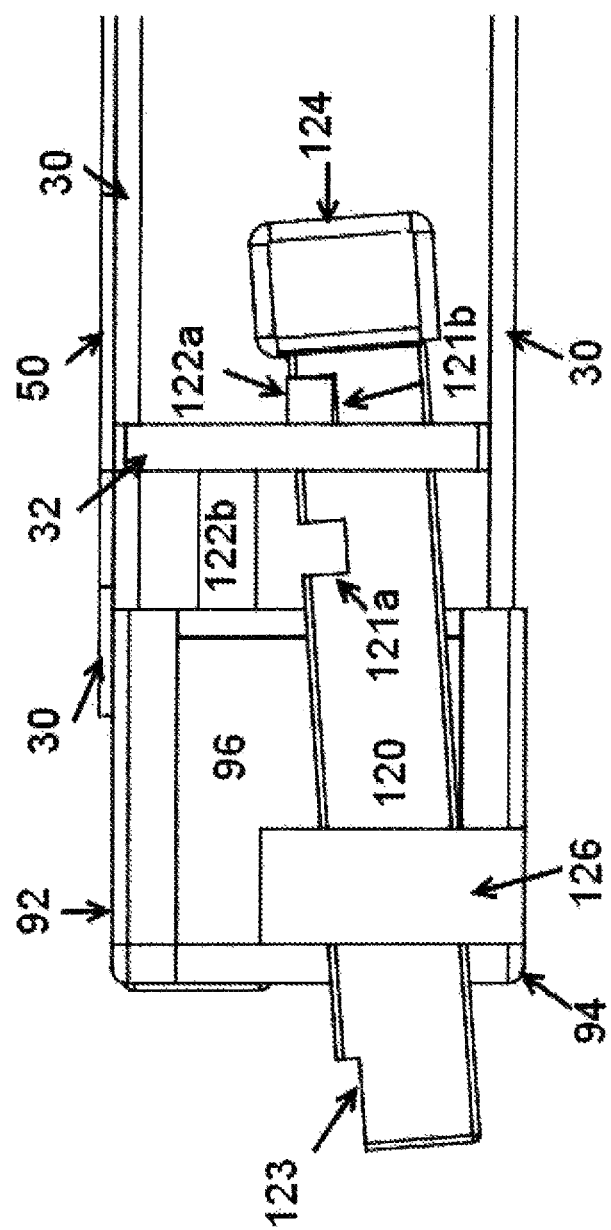
FIG. 1D—illustrates a locking bar according to an alternative embodiment of the present invention.

FIG. 1D illustrates a locking bar 120 according to a preferred form of the present invention. In this embodiment, locking bar 120 no longer extends or retracts in a substantially horizontal plane. Rather, locking bar retainer 126 is fixed lower onto the side plate 96. As a result, as locking bar 120 moves from locking bar recess 121a to locking bar recess 121b, the locking bar 120 extends in a downward direction.

In order to prevent locking bar 120 from being retracted and pulled out of locking bar retainer 126 and/or fork lift pocket plate 32, a grub screw, nut or lug may be affixed to locking bar 120 in a known manner. The a grub screw, nut or lug may then strike against the fork lift pocket plate 32 upon retraction of locking bar 120 in order to prevent the locking bar from travelling too far.

In addition, locking bar 120 includes a notch 123 that allows the locking bar to fit below the lashing bars in an ISO shipping container door frame. The inclusion of the notch 123 provides compensation for ISO shipping containers not all being constructed to exactly the same dimensions. The notch 123 allows the locking bar 120 to still engage with the lashing bar of the shipping container whilst compensating for slight variations in the exact location of the lashing bars of a door frame in an ISO shipping container.

Figure 1E:
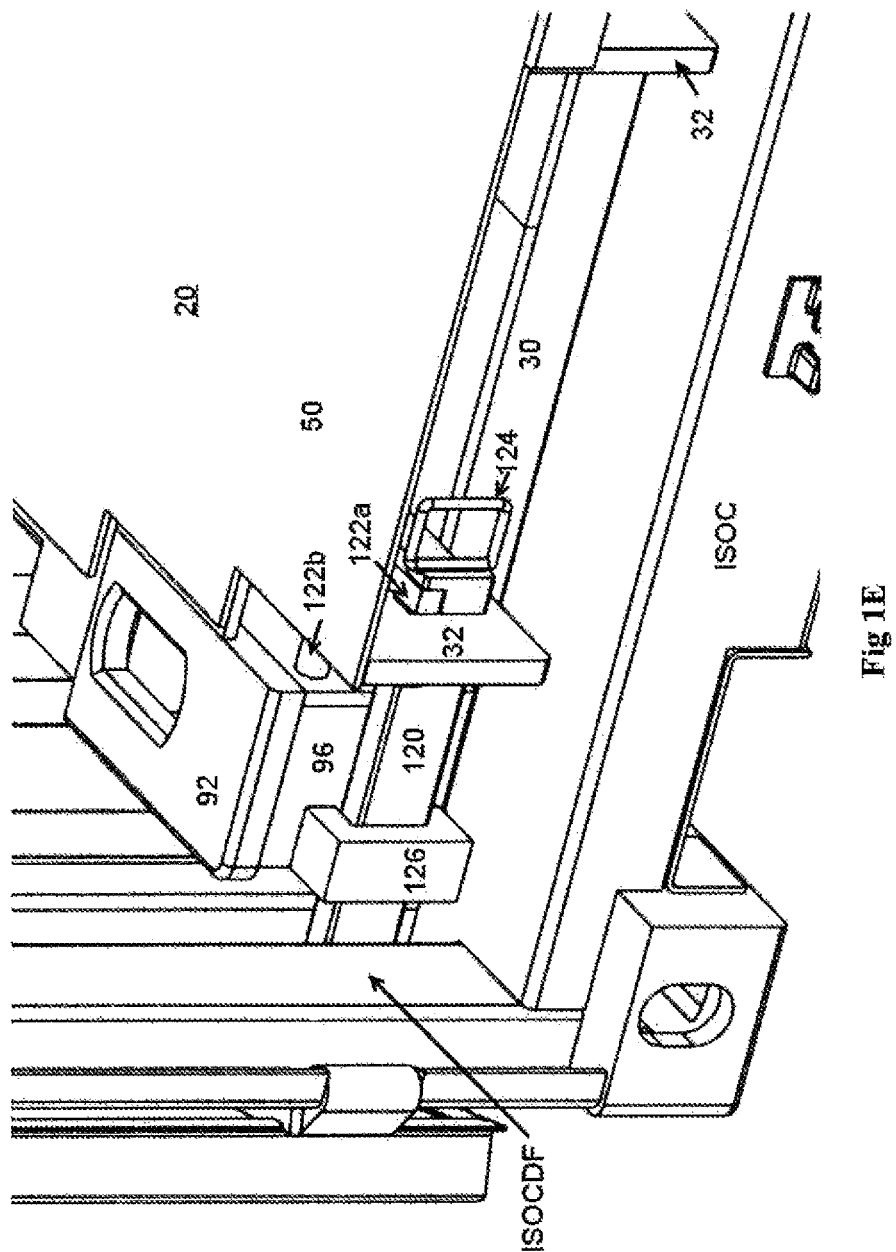
FIG. 1E—illustrates a locking bar of the platform of FIG. 1 in the locked position engaging with ISO container.

FIG. 1E shows a platform 20 in situ in an ISO shipping container (ISOC). The locking bar 120 is in the lock position where it engages with the door frame (ISOCDF) of the ISO shipping container (ISOC). The locking bar 120, once outwardly extended, prevents longitudinal motion of the platform 20 once in situ and during subsequent transportation of the ISO container.

Figure 2A:
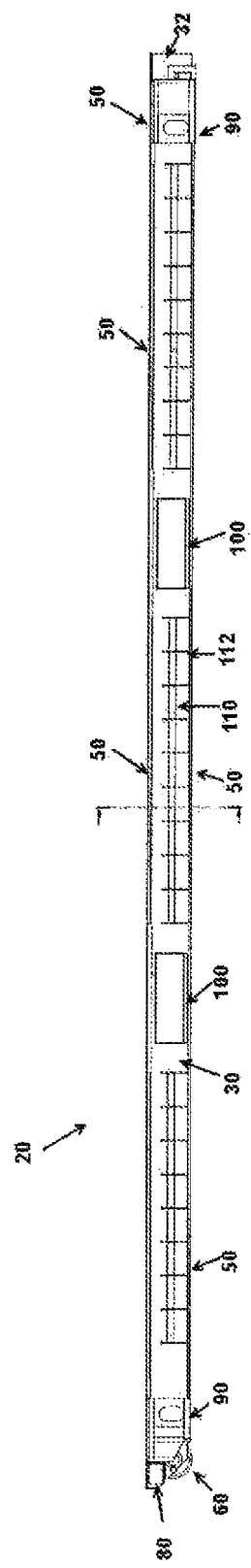
FIG. 2A—illustrates a side view of the platform according to FIG. 1.

As illustrated in FIG. 2A, platform 20 has substantially planar top and bottom surfaces created by the tread plate decking 50 being fixed to the frame 30. Specifically, in this embodiment, three pieces of tread plate decking 50 cover the top surface of platform 20. The underneath of the platform 20 is covered with a single piece of tread plate decking 50 extending from the first lateral roller unit 60 end of the platform to the nearest open fork lift pocket 100; and a second piece of tread plate decking between the open fork lift pockets 100 extending transverse to the longitudinal axis of the platform 20. In the embodiment of FIGS. 2 and 2A, tread plate decking 50 on the top surface of the platform 20 extends to the ends of fork lift pocket plates 32 and preferably includes a right angled piece partially covering the two inner most fork lift pocket plates 32 shown in FIG. 2.

Figure 2B:
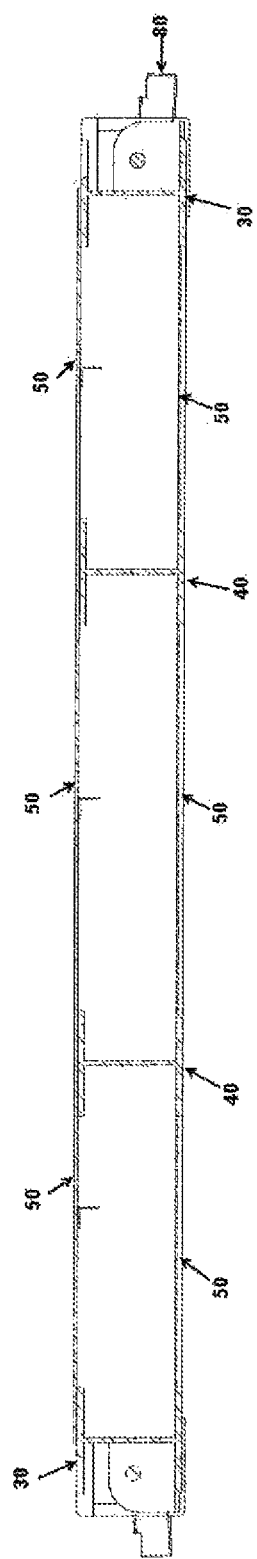
FIG. 2B—illustrates a cross-sectional view along line A-A of FIG. 2A.

FIG. 2B further illustrates the planar nature of the underside of a platform 20 of the present system. The tread plate decking 50 on the underside of platform 20 is sized to sit flush or planar with frame 30 and sub-frame 40. Whilst, on the top side of the platform 20, a single tread plate decking piece 50 sit on top of and is fixed to the frame 30 and sub-frame 40. As previously noted, tread plate decking 50 is preferably welded to the frame and sub-frame.

Figure 3:
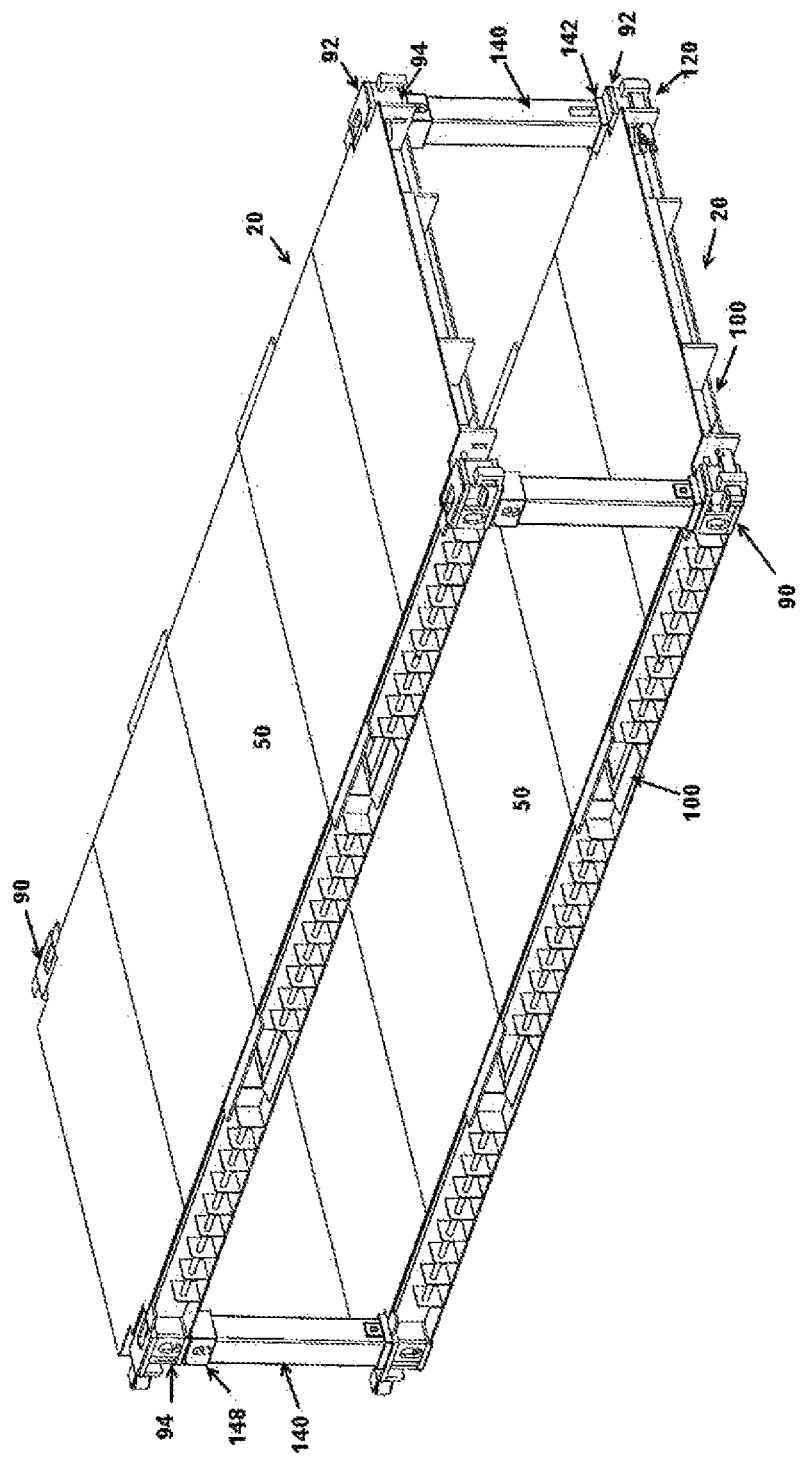
FIG. 3—illustrates the container roll out warehousing system according to the present invention using two vertically stacked platforms of FIG. 1.
Figure 3A:
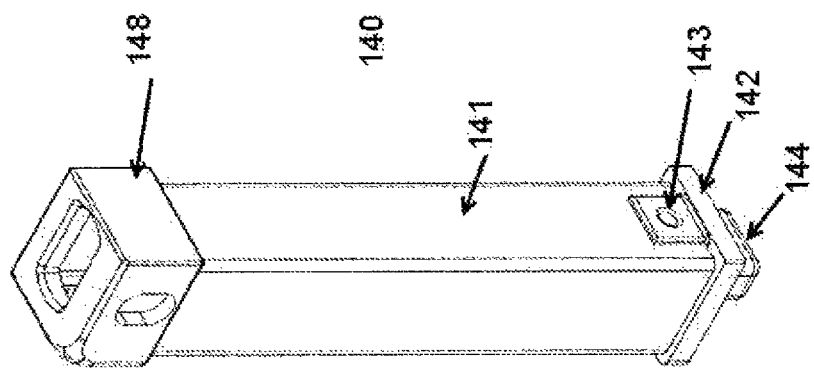
FIG. 3A—illustrates a perspective view of a removable corner post according to a preferred embodiment of the invention used in FIG. 3.

FIG. 3 illustrates a container roll out warehousing system according to a preferred form of the invention using a pair of vertically stacked platforms 20 according to FIG. 1. The platforms 20 are spaced apart by four removable corner posts 140, removably secured to the four corner castings 90 of each of the two cargo carrying platforms 20. Each removable corner post 140 includes a post base plate 142 which rests upon a top plate 92 of a corner casting 90 of the platform 20 beneath the removable corner post 140. The top end of each corner post 140 includes a post top casting 148. Once each of the removable corner posts 140 are anchored to the lower platform 20, the upper platform 20 is lowed via a fork, lift or other heavy lifting device such that each base plate 94 of the corner castings 90 of the upper platform aligns with a respective post top casting 146. The removable corner posts 140 are then fastened to the upper platform 20 using any suitable known means, such as a double ended ISO twist-lock, for example.

Whilst only two platforms 20 are illustrated in FIG. 3, additional platforms may be added in this manner in order to create more shelf storage space for cargo, according to warehousing system of the present invention.

As would be appreciated by the skilled person, the removable corner post 140 may be of different lengths to vary the distance between two vertically spaced apart platforms 20 shown in FIG. 3 depending on the size and amount of cargo to be stored in a storage yard, or transported via an ISO shipping container.

The construction of the removable corner posts 140 may also vary in cross-section or even in the type of removable corner post used, including posts well known in the art. However, the type of removable corner post selected must at one end be removably anchorable to a lower platform, and the other end of the corner post lockable to an upper platform. This is to allow a forklift to lift/raise either platform; or two or more vertically spaced apart platforms with the removable corner post remaining locked in rigid connection with the respective platforms without the corner posts moving. As would be understood by those skilled in the art, various well known anchoring methods may be employed, such as the use of ISO twist-locks or other known mechanical fastening mechanisms.

Figure 3B:
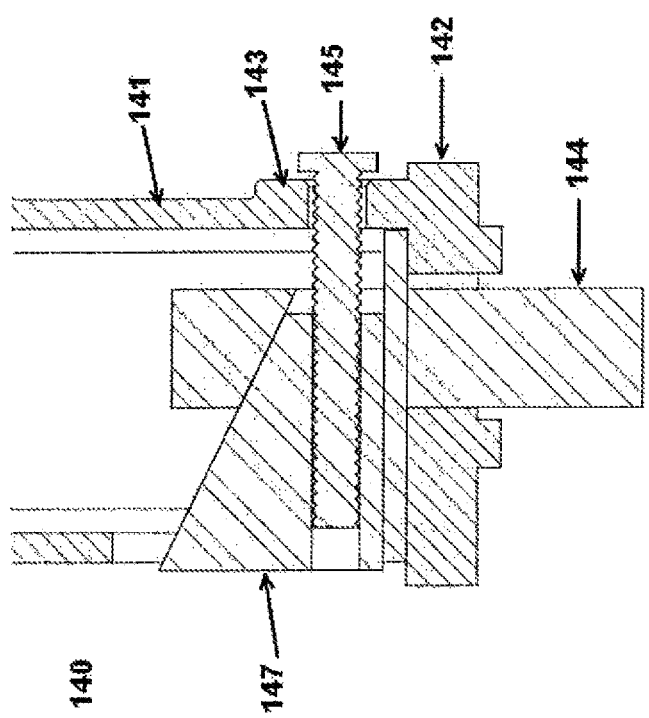
FIG. 3B—illustrates a cross-sectional view of the lower end of the removable corner post of FIG. 3A.

However, FIGS. 3A and 3B illustrate a preferred form of removable corner post 140 and fastening mechanism according to the present invention. In particular, removable corner post 140 preferably includes a hollow stem 141, a corner base plate 142, a post anchor 144 and a post top corner casting 148. FIG. 3A also shows a bolt hole 143 used to assist the locking of the post anchor 144 as is explained in more detail in FIG. 3B. Apart from post anchor 144, the remaining components of the removable corner post 140 are preferably of a steel construction and welded together. Post top corner casting 148 is of a similar construction to the corner castings of a platform, and may also be cast in a mould and subsequently welded to the stem 141.

FIG. 3B illustrates a cross-sectional view of a lower portion of a removable corner post 140 according to a particularly preferred embodiment. Post anchor 144 is longitudinally extendible from within stem 141 through the use of a wedge 147 insertable into the post anchor 144 at right-angles to the length of the anchor. Bolt 145 is inserted through bolt hole 143 integral with stem 141. The bolt 145 is received in an aperture in the wedge 147 so that as the bolt is tightened or loosened, wedge 147 slides in and out of the post anchor 144; and in turn the post anchor slides in or out of the hollow of stem 141. In this manner, the length of the post anchor protruding beyond the corner post base plate 142 is controllable.

Figure 4:
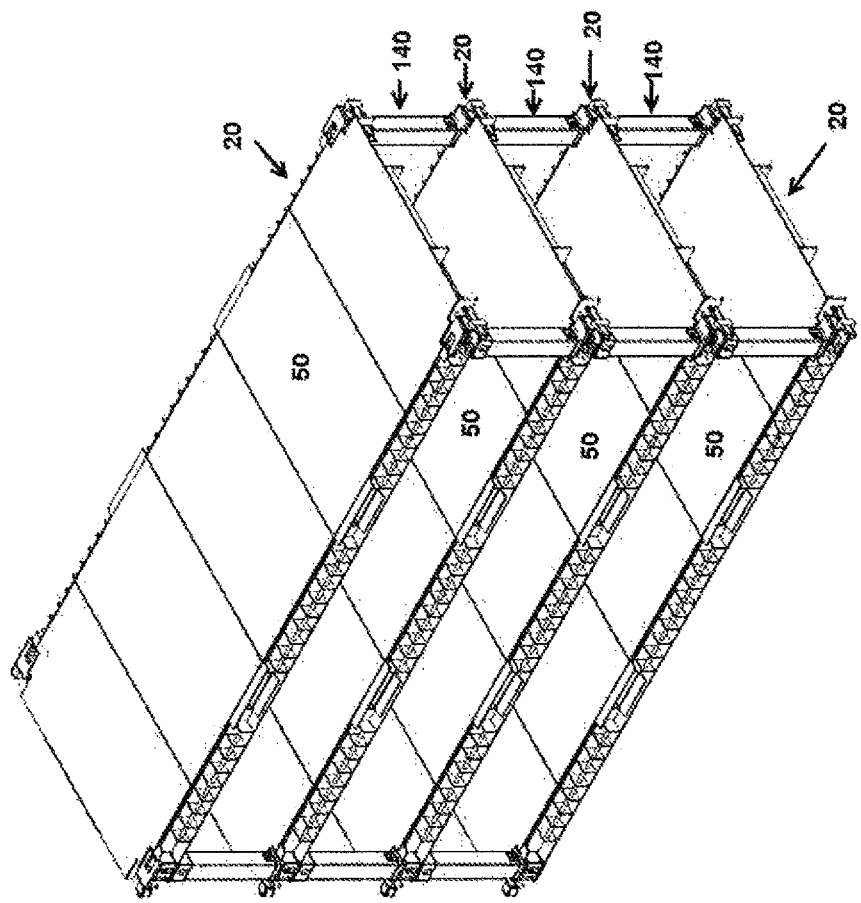
FIG. 4—illustrates the container roll out warehousing system according to the present invention using four vertically stacked platforms of FIG. 1.

FIG. 4 illustrates a preferred form of container roll out warehousing system according to the present invention using four vertically stacked platforms 20 of FIG. 1. Each platform 20 provides a planar surface via the multiple tread plate sheets 50 to receive cargo of various sizes and heights. Removable corner posts 140 may be of different heights in order to vary the vertical spacing between adjacent platforms 20 depending on the height of the cargo to be stored. Each platform 20 is individually accessible; as a fork lift upon unfastening of the appropriate corner posts 120, may lift away any of the top three platforms 20 either individually, or, in a group of two or three platforms to access the lower platform(s). In this manner, different types of cargo may be tied down and shelved on a platform 20 ready for future deployment.

Figure 5:
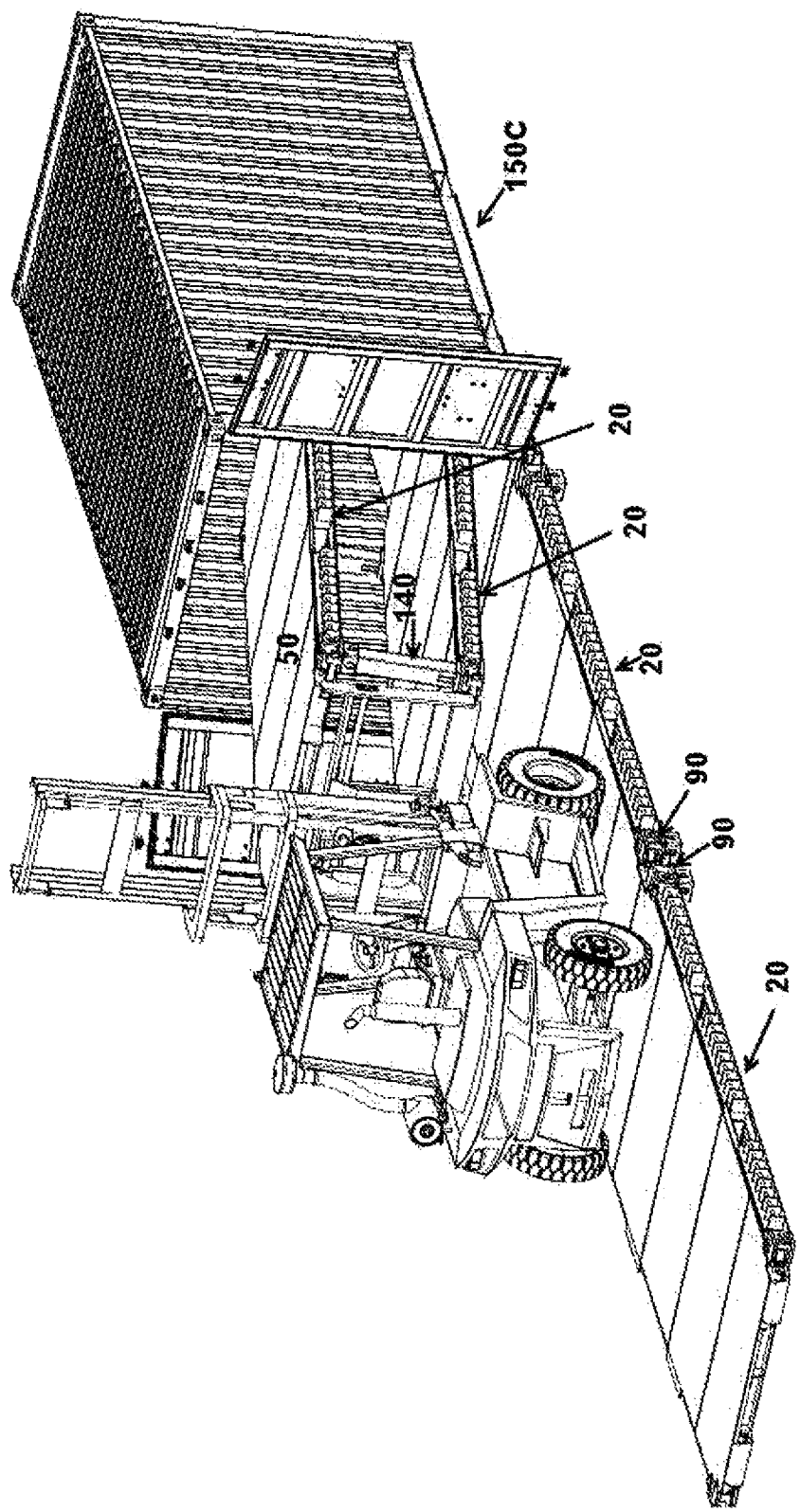
FIG. 5—illustrates the container roll out warehousing system according FIG. 3 being loaded into an ISO shipping container.

FIG. 5 illustrates the container roll out warehousing system according to FIG. 3 being loaded in to an ISO shipping container (ISOC). The fork lift tines of a fork lift vehicle engage the open fork lift pockets longitudinal with the lower platform 20. The fork lift raises the lower platform 30 until the platform clears the ground at its second lateral or locking bar end, and the lower platform 20 is free to be rolled into the ISO shipping container (ISOC) by the fork lift truck via the roller units. As would be understood by the skilled person, using removable corner posts 140 of a shorter length also allows for the number of platforms carrying cargo in a shipping container, and hence the shelf space within an ISO shipping container, to be customised. For example, in a preferred form, more than two platforms 20 may also be rolled into an ISO shipping container if the lengths of the removable corner posts 140 are selectively shortened to accommodate cargo having little height, such as sheet materials.

FIG. 6 shows a further embodiment of CROWS whereby a single platform 20 is rolled into an ISO shipping container (ISCO). A fork lift truck engages the platform 20 in the same manner as that described in FIG. 5 above. Advantageously, a single platform 20 allows large bulky cargo to be rolled from its lager position in a storage yard directly into an ISO shipping container, thereby minimising handling of the cargo.

As can be seen from FIGS. 5 and 6, advantageously, CROWS also allows for the platform 20 of FIG. 1 to act as a ramp and stable road surface for the fork lift vehicle to drive on whilst loading a further platform(s) 20 in to the ISO shipping container (ISOC).

FIG. 7 illustrates a further aspect of the CROWS invention wherein two platforms 20 are inter-connectable such that the longitudinal axis of each of the two platforms 20 are collinear, thereby doubling the surface area available to receive cargo. In the embodiment of FIG. 7, a tynecat container loader (TC) rolls two collinearly inter connected 20 ft platforms 20 into a 40 ft ISO shipping container (ISOC). The tynecat container loader (TC) engages the longitudinal open forklift pockets of a first platform 20 in order to raise it off the ground, thereby enabling the collinear platforms 20 to be rolled in the ISO shipping container (ISCO) via the roller units of second of the two platforms 20.

In a particularly preferred embodiment, to substantially conform to the internal footprint of an ISO 40 ft shipping container and minimise the space between the shipping container walls once the combined platform is inserted into the 40 ft container; the length of the combined platforms 20 may be up to but no greater than 12192 mm, and the width may not exceed 2343 mm.

Figure 7A:
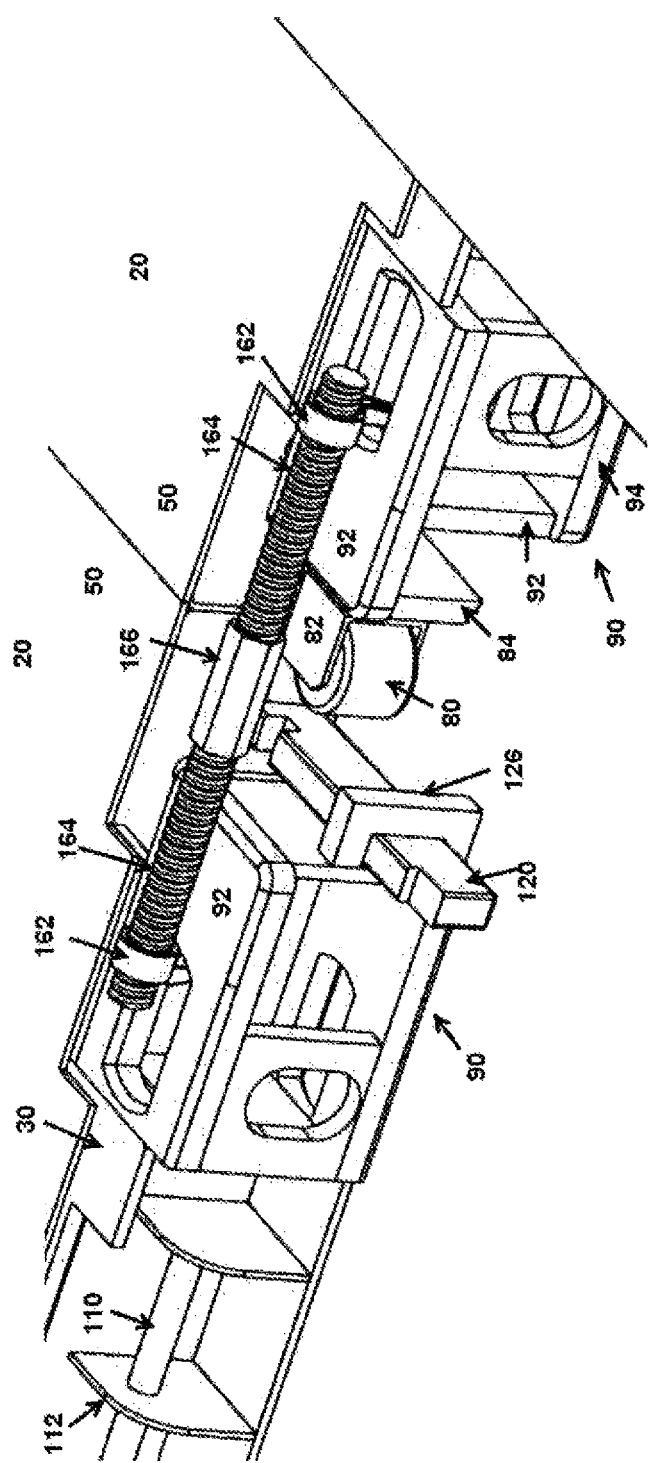
FIG. 7A—illustrates a top perspective view of the two collinearly joined platforms of FIG. 7.
Figure 7B:
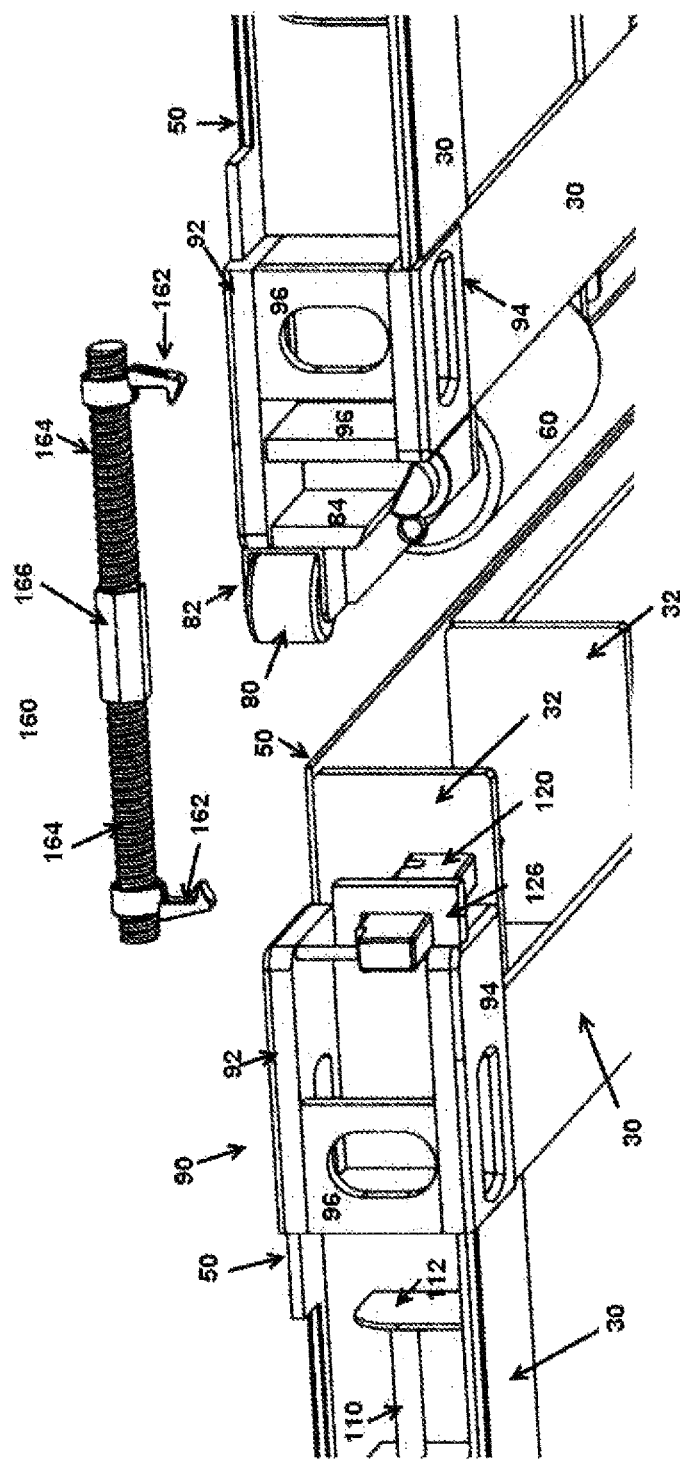
FIG. 7B—illustrates an exploded view of the two collinear platforms of FIG. 7 and a preferred collinear locking brace according to the present invention.

FIGS. 7A and 7B illustrate two platforms 20 collinearly inter-connected according to a preferred embodiment of CROWS invention. Preferably, a locking brace 160 interconnects the locking bar end of a first platform 20 with the roller unit end of a second platform 20 such that the two platforms abut each other and a planar surface to receive cargo is provided by the tread plate decking 50 of each platform 20.

Locking brace 160 preferably includes a pair of adjustable claws 162 which a threaded onto a pair of threaded rods 164 so that each threaded rod 164 retains one adjustable claw 162. Threaded rods 164 are interconnected via a locking nut 166 into which an end of each of the respective threaded rods 164 is screwed. The effective length of the locking brace 160 may be adjusted to a suitable length by winding the adjustable claws 162 along the threaded rods 164 so that they hook onto the edge of the aperture of the apertured top plates 92 of each of the corner castings 90 of the respective ends of the two cargo platforms 20 to be collinearly connected. The locking nut 166 of the locking brace 160 is then rotated to further close the gap between the two opposed adjustable claws 162 thereby ensuring the locking brace 160 is securely bracing and connecting the two platforms together. It will be understood by the skilled person that more than two cargo carrying platforms may be collinearly inter-connected by repeatedly abutting platforms in the above described manner and subsequently connecting them using the locking brace 160. As would be recognised by the skilled person alternative mechanical fastening mechanisms may also be used provided that they rigidly interconnect two adjacent platforms.

Once collinearly joined, the connected platforms 20 may also act as a ramp and road surface as shown in FIGS. 5 and 6. As shown in FIGS. 5 and 6, the floor of an ISO shipping container (ISOC) is typically raised off the ground due to the frame of the ISO shipping container. This creates a step which any platform 20 being rolled in to/out of the ISO shipping container (ISOC) needs to negotiate. In order to address this problem, individual corner castings 90 are connected to the underside of the corner castings 90 of a first platform 20 and the underside of the corner castings 90 at one end of a second platform 20. Preferably the corner castings 90 are interconnected using known ISO twist-locks. Once the corner castings 90 are connected, the two platforms 20 may be collinearly connected preferably as described with respect to FIGS. 7-7B. This effectively creates a rigid ramp for a fork lift truck or other transportation vehicle such as a tynecat container loader to use in loading cargo into an ISO shipping container. The collinearly connected platforms 20 are then manoeuvred into place such that the end of the connected platforms without corner castings fixed to its underside is furthest from the ISO shipping container (ISOC) and the platform of the two connected platforms 20 having corner castings 90 fixed to the underside of each corner abuts the ISO shipping container.

Figure 8:
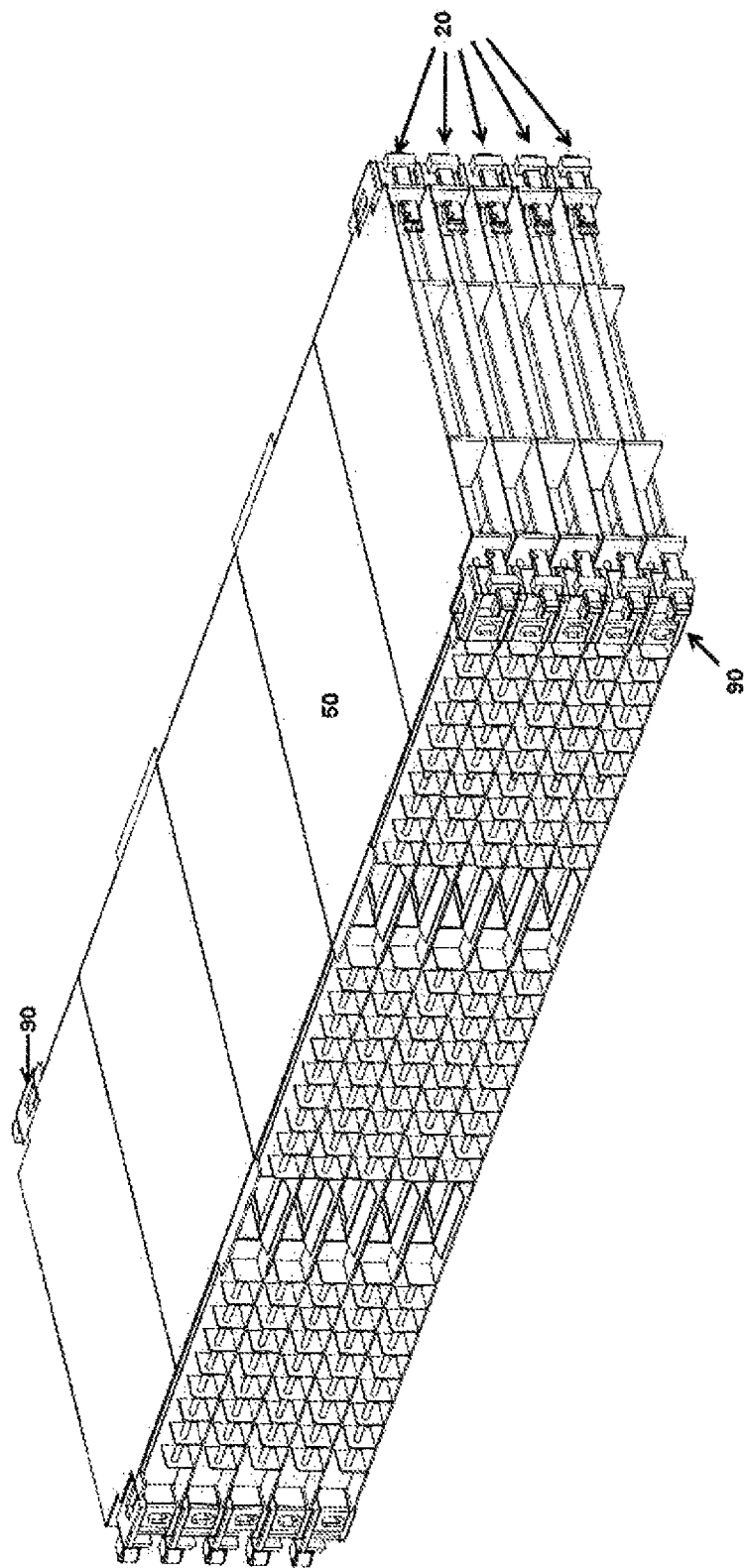
FIG. 8—illustrates five platforms according to FIG. 1 in a nested configuration.

FIG. 8 illustrates five platforms 20 according, to FIG. 1 in a nested configuration ready for storage in an ISO shipping container, or on another platform in a storage yard or ready for further transportation as a group of platforms. Preferably the nested platforms 20 are interlocked using double-ended ISO twist-locks to lock adjacent corner castings 90 so that an individual platform 20 is fixable to the platform directly above it and directly below it. As can been from FIG. 8, each of the nested platforms 20 is oriented so that like ends of the platforms are nested on top of each other. In a preferred embodiment up to eight platforms may be nested together and fit into in ISO shipping container for further transportation.

Figure 9:
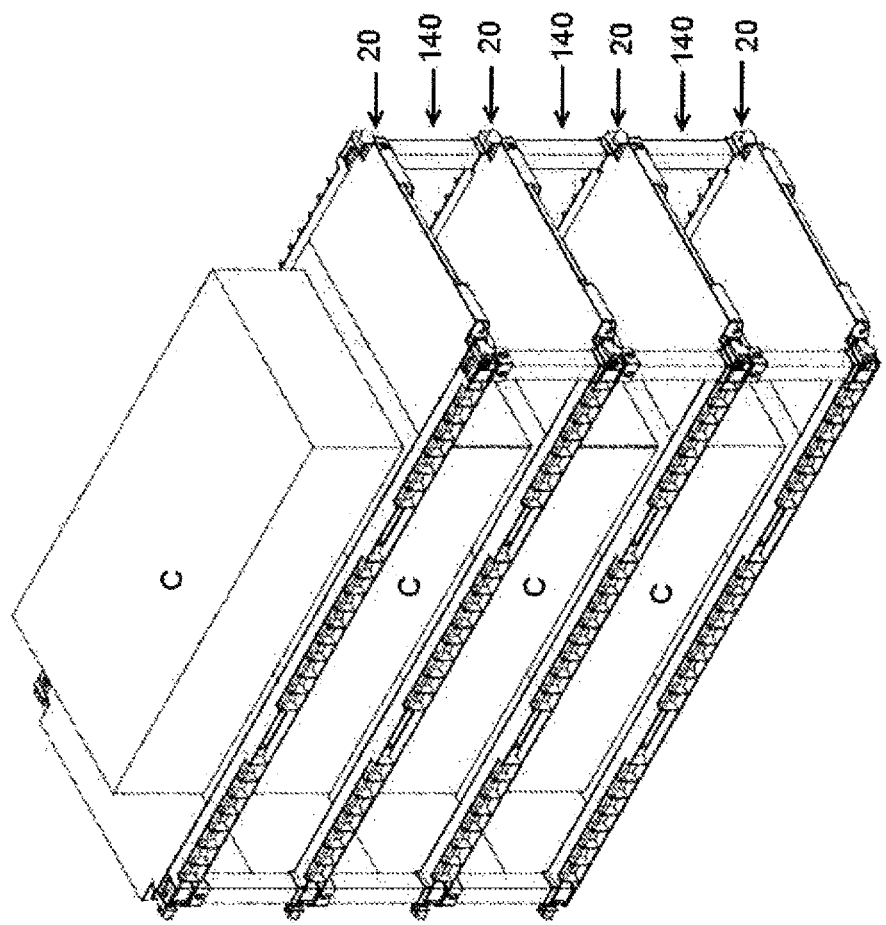
FIG. 9—illustrates the container roll out warehousing system according to the present invention using four vertically stacked platforms of FIG. 1 to warehouse cargo in situ.

FIG. 9 illustrates the preferred container roll out warehousing system of FIG. 4 laden with cargo C on each tier of four vertically spaced apart platforms 20. Advantageously, each piece of cargo C may be individually secured to an individual platform using known tie-down devices such as ropes or straps fastened to a tie-down rail previously described.

In addition, the four platforms 20 are each individually accessible in the following manner for further transportation. Preferably, the ISO twist-lock fasteners fixed between the removable corner posts 140 and the individual platform 20 sought, are loosened and removed. A forklift is then able to lift and remove any platform 20 for platforms) above the sought platform 20. The sought after platform is then readily accessible. Using a similar process, an individual platform is readily re-stacked at a desired level amongst an existing stack of platforms. For example, a platform having a heavier piece of cargo thereon is easily stacked at the bottom tier of a multiple stack of platforms to make the shelving arrangement sturdier and safer.

All of the removable corner posts 140 shown in the embodiment of FIG. 9 are of the same length. However, it will be appreciated that removable locking posts 140 of different lengths may be selected to vary and customise the distance between two adjacent platforms 20 in order to accommodate cargo C of different heights and sizes.

Figure 10:
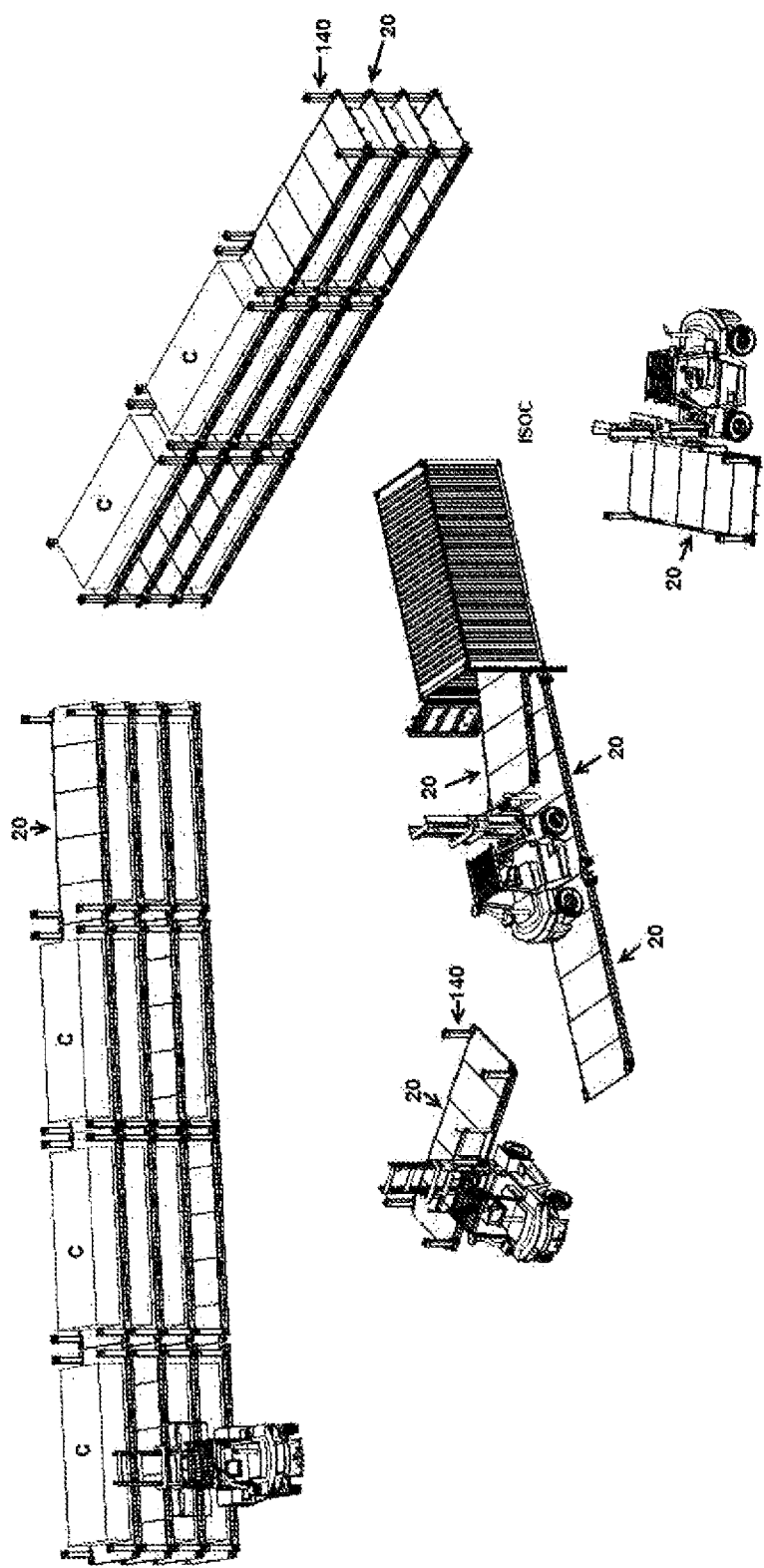
FIG. 10—illustrates the container roll out warehousing system in operation in a storage yard.

FIG. 10 illustrates an embodiment of the container roll out warehousing system of the present invention in operation as a storage yard. Numerous rows of vertically stacked cargo-carrying platforms 20 are spaced about a yard as three or four tiered storage shelfing to hold cargo C. As would be recognised, an ISO shipping container (ISOC) is then loadable with one or more platforms 20 close at hand to the ISO shipping container. Preferably, at least two platforms are collinearly connected and subsequently abutted to the ISO shipping container to provide a ramp and stable terrain for forklift devices to roll cargo carrying platforms 20 into the ISO shipping container (ISOC). In a particularly preferred form of the container roll out warehousing system shown in FIG. 10, prior to use as storage shelving, each of the platforms 20 has fixed on each corner thereof, a removable corner post 140 which extends upwards from each platform. This advantageously allows a platform 20 to more efficiently and safely connect to an existing vertically spaced stack of platforms 20 or an individual platform 20. In particular, this preferred embodiment eliminates the need for a user to climb a column of vertically stacked platforms, or climb over, if even possible, any cargo C, to fix removable corner posts 140 at a later time should a further platform 20 be required for the stack.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A container roll out warehousing system for carrying or storing cargo, comprising:
   at least two inter-connectable modular platforms, wherein each platform includes:
      a substantially planar top surface for receiving cargo;
      at least one roller unit at a first lateral end of the platform;
      a pair of open fork lift pockets transverse to a central longitudinal axis of the platform;
      two pair of fork lift pocket plates at a second lateral end of the platform opposite to the first lateral end, to locate a pair of lifting tines of a fork lift device under the platform; and
      a corner casting at each corner of the first and second lateral ends of the platform wherein a top plate of the corner casting is at or below the substantially planar top surface; and
   wherein the container roll out warehousing system is operable so that two or more of said platforms have a structure configured to allow the platforms to be releasably inter-connectable such that the central longitudinal axes of the two or more platforms are collinear; and wherein the structure is further configured to allow the platforms to be releasably inter-connectable such that the two or more platforms are vertically stackable in a spaced apart relationship using a plurality of removable corner posts releasably fastenable to the corner castings of the two or more platforms to vertically space apart the said two or more platforms.

2. The container roll out warehousing system of claim 1 wherein the footprint of each platform substantially conforms to the internal footprint of an International Standards Organization (ISO) shipping container to minimize the space between the shipping container walls and the platform once the platform is positioned within the ISO shipping container.

3. The container roll out warehousing system according to claim 1 wherein the plurality of removable corner posts are each releasably anchorable to a corner of each of two platforms to provide two interconnected vertically spaced apart platforms rollable into an ISO shipping container.

4. The container roll out warehousing system according to claim 1 wherein each platform includes a locking bar mounted at each corner of the second lateral end of each platform.

5. The container roll out warehousing system according to claim 4 further comprising an ISO shipping container, and wherein each locking bar is configured to slide from each platform into a cavity disposed on an interior sidewall of the ISO shipping container when each platform is within the ISO shipping container to thereby couple each platform with the ISO shipping container.

6. The container roll out warehousing system according to claim 5 wherein each locking bar is slideable through an aperture on a fork lift pocket plate closest to a corner of the second lateral end of each platform.

7. The container roll out warehousing system according to claim 4 wherein a guide roller is mounted to each corner casting at the first lateral end of each platform.

8. The container roll out warehousing system according to claim 1 wherein each of the pair of open fork lift pockets transverse to the longitudinal axis of each platform includes a substantially U-shaped channel transverse to the longitudinal axis of the platform.

9. The container roll out warehousing system according to claim 1 wherein up to eight platforms are nestable on top on each other such that the combined height of the eight nestable platforms fits within an ISO shipping container for storage or further transportation.

10. The container roll out warehousing system according to claim 1 wherein each platform includes at least one tie down rail parallel to the longitudinal axis of each platform.

11. The container roll out warehousing system according to claim 1 wherein a pair of collinear lock braces are fastenable to adjacent corner castings of two or more platforms to releasably interconnect the two or more platforms in their longitudinally collinear orientation.

12. The container roll out warehousing system according to claim 11 wherein two or more collinearly aligned platforms include a plurality of corner castings releasably fastened to their underside such that the two or more collinearly aligned platforms provide a ramp for access into an ISO shipping container.

13. The container roll out warehousing system according to claim 1 wherein each corner casting is multi-apertured.

14. A method of storing cargo comprising the step of assembling in a storage yard, a plurality of container roll out warehousing systems according to claim 1.

15. The method of storing cargo according to claim 14 wherein each platform of container roll out warehousing system includes a removable corner post releasably fastened to a top surface of each corner casting of each platform.

16. The system of claim 1, wherein each platform comprises first, second, third, and fourth frames, each of which defines a side of the platform, and wherein the first frame is disposed on an opposite side of the second frame, and wherein the third frame is disposed on an opposite side of the fourth frame and perpendicular to the first and second frames, and wherein a corner casting is disposed at each of (i) a first end of the first and third frames, (ii) a first end of the second and fourth frames, (iii) a second end of the first and fourth frames, and (iv) a second end of the second and third frames.

17. The system of claim 1, wherein each of the corner castings has a first side with an aperture.

18. The system of claim 17, wherein the first side of each corner casting has a length that is shorter than a length of a base plate of the corner casting.

19. The system of claim 1, wherein each of the corner castings is configured to receive a post anchor of a removable corner post.

* * * * *